United States Patent [19]

Tran

[11] Patent Number: 5,308,884
[45] Date of Patent: May 3, 1994

[54] STABILIZED POLYETHER POLYOL AND POLYURETHANE FOAM OBTAINED THEREFROM

[75] Inventor: Uyen T. Tran, Naugatuck, Conn.

[73] Assignee: Uniroyal Chemical Company, Inc., Middlebury, Conn.

[21] Appl. No.: 123,622

[22] Filed: Sep. 17, 1993

Related U.S. Application Data

[62] Division of Ser. No. 023,325, Feb. 26, 1993, Pat. No. 5,269,961.

[51] Int. Cl.$^5$ ................................................ C08J 9/00
[52] U.S. Cl. ..................................... 521/128; 521/163
[58] Field of Search ................................. 521/128, 163

[56] References Cited

U.S. PATENT DOCUMENTS

| | | |
|---|---|---|
| 3,452,056 | 6/1969 | Sundholm ............................ 564/433 |
| 3,505,225 | 4/1970 | Wheeler .................................. 252/50 |
| 3,649,690 | 3/1972 | Wheeler ................................ 564/315 |
| 3,666,716 | 5/1972 | Wheeler ................................ 524/258 |
| 3,751,472 | 8/1973 | Wheeler ................................ 564/315 |
| 3,758,519 | 9/1973 | Wheeler ................................ 564/315 |
| 3,781,361 | 12/1973 | Wheeler ................................ 564/315 |
| 3,944,492 | 3/1976 | Wheeler .................................. 252/50 |

FOREIGN PATENT DOCUMENTS 261547  5/1989  Czechoslovakia .

*Primary Examiner*—Morton Foelak
*Attorney, Agent, or Firm*—Raymond D. Thompson

[57] ABSTRACT

A liquid stabilizer composition for polyether polyols used in the production of flexible and semiflexible polyurethane foams contains a mixture of 4-alpha,alphadimethylbenzyl diphenylamine and 4,4'-bis-(alpha,alphadimethylbenzyl) diphenylamine.

4 Claims, No Drawings

STABILIZED POLYETHER POLYOL AND POLYURETHANE FOAM OBTAINED THEREFROM

This is a division of application Ser. No. 08/023,325, filed Feb. 26, 1993, now U.S. Pat. No. 5,269,961.

BACKGROUND OF THE INVENTION

This invention relates to a liquid stabilizer composition, to a polyether polyol stabilized against degradation by tho liquid stabilizer composition and to a polyurethane foam obtained from the stabilized polyether polyol. More particularly, the invention relates to the stabilization of polyether polyols employing a liquid stabilizer composition containing a mixture of mono- and dialpha methyl styrenated diphenylamines and inhibiting scorch in flexible and semiflexible polyurethane foams made from the stabilized polyether polyols.

Substituted diphenylamines of the general formula:

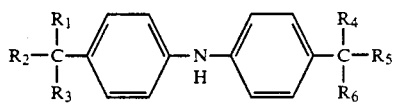

wherein at least one of $R_1$, $R_2$ and $R_3$ is phenyl and at least one of $R_4$, $R_5$ and $R_6$ is phenyl, the remaining R's being methyl, phenyl, p-tolyl, neopentyl or 2-phenylisobutyl, are disclosed in U.S. Pat. Nos. 3,452,056, 3,505,225, 3,649,690, 3,666,716, 3,751,472, 3,758,519, 3,781,361 and 3,944,492. Such substituted diphenylamines and their combinations are useful as antioxidants for the protection of polymers having relatively low olefinic unsaturation such as polyolefins and acrylonitrile-butadiene-styrene polymers and other polymers such as polyamides, polyesters and acetal resins and lubricant compositions. No mention is made in any of the foregoing patents of the use of such substituted diphenylamines as stabilizers for polyether polyols used in the production of polyurethane foams.

Czech Patent No. 261,547 discloses a stabilizer composition, useful as an antioxidant and heat stabilizer for rubber latexes, polyolefins, polyamides and oils, which consists of a mixture of from about 3 to about 55 weight percent of a monoalpha methyl styrenated diphenylamine, i.e., 4-alpha, alpha-dimethylbenzyl diphenylamine which may be represented by the structural formula:

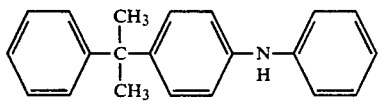

and from about 45 to about 97 weight percent of a dialpha methyl styrenated diphenylamine, i.e., 4,4'-bis-(alpha, alpha-dimethylbenzyl) diphenylamine which may be represented by the structural formula:

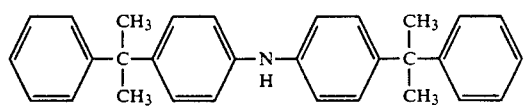

Czech Patent No. 261,547 does not disclose the use of this mixture as a stabilizer for polyether polyols or for polyurethanes manufactured from such polyols.

SUMMARY OF THE INVENTION

The liquid stabilizer composition that is the subject of this invention is of particular importance to the polyether polyel/flexible polyurethane industry due to the improved scorch inhibition, hydrolytic stability, color stability and increased performance that the stabilizer provides. Moreover, environmental concerns and considerations of product safety militate against the use of chlorofluorocarbons (CFCS) and dust-producing solid stabilizers. Since CFCs prevent discoloration, physical scorch and self-ignition of the foam, higher performance standards for stabilization systems are warranted.

A safety feature sought after in the industry is a stabilizer composition that performs at least as well as the solid stabilizers currently in use but which comes in liquid form. Among the advantages of a liquid stabilizer composition is the ability to use metering devices for its addition to polyols thus helping to ensure the use of consistent amounts of stabilizer composition which in turn leads to improved consistency of the polyurethane foams made from the polyols.

It would therefore be advantageous to provide a liquid stabilizer composition for polyether polyols employed in the production of flexible and semiflexible polyurethane foams that provides increased scorch protection for the foams, allows the foams to be produced at higher internal temperatures and eliminates the use of CFCs without adversely affecting the properties of the foams.

Accordingly, it is an object of the present invention to provide a liquid stabilizer composition for polyether polyols which provides a high level of protection against oxidation, scorching and discoloration in polyurethane foams manufactured therefrom. The liquid nature of the stabilizer composition offers the advantages of reduced handling, accurate metering directly into the polyol, reduced processing time and reduced worker exposure.

It is a further object of this invention to provide a liquid stabilizer composition which eliminates the use of environmentally hazardous CFCs heretofore used in flexible polyurethane foam production.

It is still another object of this invention to provide a flexible polyurethane foam product made from the stabilized polyether polyol with the foam exhibiting improved scorch performance, appearance and color.

Yet another object of the invention is the stabilization of other polymers such as polystyrenes, acrylonitrile-butadiene styrene terpolymers, polyvinyl chlorides, polyesters, cellulosics, etc., against degradation employing the liquid stabilizer composition herein.

These and other objects are achieved by the liquid stabilizer composition of the present invention which comprises a mixture of 4-alpha,alpha-dimethylbenzyl diphenylamine and 4,4'-bis-(alpha,alpha-dimethylbenzyl) diphenylamine.

DESCRIPTION OF THE PREFERRED EMBODIMENTS

The individual components of the liquid stabilizer composition herein can be made by reacting alpha-methyl styrene and diphenylamine, a procedure for which is described in Example 1, infra. In general, the mole ratio of the 4-alpha,alpha-dimethylbenzyl phenylamine to the 4,4'-bis-(alpha,alpha-dimethylbenzyl)diphenylamine can range from about 1.4 to about 20 and preferably from about 1.5 to about 10.

The diphenylamines of this invention can be combined with one or more other known and conventional stabilizer materials, e.g., phenolics, phosphites, etc., provided the resulting stabilizer composition remains liquid.

Examples of optional phenolic components include butylated hydroxytoluene (BHT), 2,6-d-t-butyl-4-sec-butylphenol, octadecyl 3,5-di-t-butyl-4-hydroxyhydrocinnamate, 2,2'-ethylidenebis-(4,6-di-t-butylphenol), 2,3'methylenebis(4-ethyl-6-t-butylphenol), 2,2'-methylenebis(4-methyl-6-t-butylphenol, and the like. The phenolic can generally be present in the stabilizer composition in an amount of from about 10 to about 90 weight percent, preferably from about 30 to about 70 weight percent and more preferably from about 50 to about 60 weight percent.

Phosphites that can optionally be added to the stabilizer composition of this invention include phenyl diisodecyl phosphite, tris(nonylphenyl)phosphite and, more recently, tris(2,4-di-t-butylphenyl)phosphite which has become an industry standard for maximizing hydrolytic stability. Where utilized, the phosphite can generally be present in the stabilizer composition in an amount ranging from about 0.5 to about 10 weight percent, preferably from about 2 to about 8 weight percent and more preferably from about 2 to about 5 percent. Triisopropanolamine can be included to increase the hydrolytic stability to the foregoing phosphites.

As previously indicated, the liquid stabilizer composition of this invention is particularly useful for the stabilization of polyether polyols, primarily from degradation resulting from oxidation. Polyether polyols are well known in the art and are obtained by reacting polyhydric alcohols, e.g., those containing from 2–8 hydroxyl groups such as ethylene glycol, propylene glycol, diethylene glycol, 2,3-butylene glycol, 1,3-butylene glycol, 1,5-pentane diol, glycerol, trimethylolpropane, triethylolpropane, sorbitol, pentaerythritol, and mixtures thereof, with a 1,2-epoxide, e.g., ethylene oxide, propylene oxide, butylene oxide, cyclohexane oxide, glycidol and mixtures thereof. The preferred polyether polyols contain from 2–4 hydroxyl groups and are obtained by reacting one or more polyhydric alcohols having a like number of hydroxyl groups with ethylene oxide, propylene oxide, butylene oxide, and mixtures thereof.

The liquid stabilizer composition is added to the polyether polyol in an amount sufficient to impart an appreciable stabilizing effect. In general, this amount may vary from about 0.1 to about 2 weight percent, preferably from about 0.2 to about 1 weight percent and more preferably from about 0.4 to about 0.6 weight percent by total weight of polyether polyol. Where the polyether polyol is to be employed in the manufacture of a polyurethane foam and stabilization of the polyol is not in issue, the stabilizer composition can be added to some other component of the polyurethane-forming reaction mixture, e.g., to the polyisocyanate, the prepolymer, the foaming agent, etc., or to the reaction mixture once formed, rather than to the polyol. In this case, the foregoing amounts of liquid stabilizer composition calculated on the basis of the total polyether polyol component can be utilized.

Any suitable organic isocyanate which is capable of reacting with a polyol to form a polyurethane can be employed in preparing the foam. This includes diisocyanates and polyisocyanates, e.g., triisocyanates and polymeric isocyanates. Due to their commercial availability, the polymeric isocyanates and tolylene diisocyanate are preferred. The latter, the use of which is more preferred, can be supplied in the form of an isomeric mixture of about 80 weight percent of 2,4-isomer and about 20 weight percent of 2,6-isomer. Other typical isocyanates include 4,4'-methylene-bis(phenylisocyanate), 3,3'-bitolylene-4,4'diisocyanate, 3,3'-dimethoxy-biphenylene-4,4'-diisocyanate, naphthalene-1,5-diisocyanate, hexamethylene diisocyanate, 1,4-phenylene diisocyanate, polyphenylene polymethylene isocyanate, etc. The amount of isocyanate employed in the preparation of the polyurethane foams should be sufficient to provide at least about 0.7 NCO groups per hydroxyl group present in the reaction system. An excess of isocyanate compound can be conveniently employed; however, the use of a large excess is generally undesirable due to the high cost of the isocyanate compounds. It is preferable, therefore, to employ no greater than about 1.5 NCO groups per hydroxyl group, and still more preferably from about 0.9 to about 1.3 NCO groups per hydroxyl group.

In preparing the polyurethane foams, the polyol containing the liquid stabilizer composition of this invention is reacted with the organic isocyanate in the presence of a foaming agent and a reaction catalyst. The foaming agent can be any one of those known to be useful for this purpose, e.g., water. The amount of foaming agent employed can be varied within a wide range. Generally, water is employed in an amount of from about 0.1 to about 10 parts by weight per 100 parts by weight of the polyol.

The catalyst used in preparing the polyurethane foams can be any one of those known to be useful for this purpose or mixtures thereof, including tertiary amines and metallic salts. Typical tertiary amines include N-methyl morpholine, N-hydroxyethyl morpholine, triethylene diamine, dimethyl ethanolamine, tetramethylbutane diamine, trimethylamine, triethylamine, etc. Typical metallic salts include the salts of antimony, tin and iron, e.g., dibutyltin dilaurate, stannous octoate, etc. Generally speaking, the catalyst is employed in an amount ranging from about 0.1 to about 2.0 weight percent based on the weight of the polyol.

It is preferred in the preparation of the polyurethane foams of the present invention to employ minor amounts of a surfactant in order to improve the cell structure of the polyurethane foams. Typical of such surfactants are the silicon-based surfactants as disclosed, e.g., in U.S. Pat. No. 2,834,748 and in the book "Rigid Plastic Foams" by T.H. Ferrigno (1963), Reinhold Publishing Company. Other suitable compounds useful as surfactants include synthetic detergents such as oxyethylated nonyl phenol and other ethylene oxide and glycidol-based surfactants. Generally up to about 2 parts by weight of the surfactant is employed per 100 parts by weight of polyol.

Various additives can also be employed in preparing the foam which serve to provide different properties. Fillers, e.g., clay, calcium sulfate, barium sulfate, ammonium phosphate, etc., can be added to lower cost and improve physical properties. Dyes can be added for color and fibrous glass, asbestos, or synthetic fibers can be added for strength. In addition, plasticizer, deodorants and flame retardants can be added.

The following examples are illustrative of the invention.

EXAMPLE 1

This example illustrates the preparation of a mixture of methyl-styrenated diphenylamines useful as a liquid stabilizer composition in accordance with this invention.

Diphenylamine (1949.5 g) was placed in a reaction vessel equipped with stirring bar, condenser and thermometer and dissolved in xylene (600 g). The solution was constantly stirred and maintained under nitrogen atmosphere. Filtrol 20X (585 g), a clay catalyst from Englehard Company, was added to the solution and thereafter the mixture was heated to temperatures ranging from about 100° to about 130° C. to remove water.

After the water had been removed, the reaction vessel was cooled to 100° C. At this temperature, alphamethyl styrene (1363.5 g) was added over a period of five hours with stirring. The mixture was then stirred for another hour at 100° C., cooled to 80° C. and filtered to remove Filtrol 20X. The mixture was stripped under vacuum and under a vigorous nitrogen sparge to remove unreacted diphenylamine.

The liquid reaction product was analyzed by gas chromatography to contain 53.0 mole percent mono-alpha methyl styrenated diphenylamine, 36.5 mole percent di-alpha methyl styrenated diphenylamine and 0.5 mole percent unreacted diphenylamine. Accordingly, the molar ratio of mono-alpha methyl styrenated diphenylamine to di-alpha methyl styrenated diphenylamine in the reaction product was 1.45.

EXAMPLES 2-13 AND COMPARATIVE EXAMPLES 1-9

Examples 2–13 and Comparative Examples 1–9 were carried out employing the same procedures set forth in Example 1 but varying the amounts of reactants used. The relative molar concentrations and molar ratios of mono-alpha methyl styrenated diphenylamine (MAMS DPA) and di-alpha methyl styrenated diphenylamine (DAMS DPA) in the resulting reaction products were determined by gas chromatography employing the method described herein.

A sample of each reaction mixture (0.05 g) was dissolved in methylene chloride (10 ml). Any clay in the sample was allowed to settle to the bottom of the vial. The instrument used was a Varian Vista Series 6000 with a 5 meter capillary column and FID detector.

The program temperature profile used was as follows:

| Initial Temperature | 50° C. |
|---|---|
| Hold at Initial Temperature | 0 min. |
| Ramp 1 Temp. Increase Rate | 8° C./min. |
| Ramp 1 Final Temperature | 300° C. |
| Hold at Ramp 1 Final Temp. | 10 min. |
| Injection Temperature | 200° C. |
| Ionizing Temperature | 320° C. |

The GC integrator was programmed to ignore all peaks before 3.4 minutes and to stop collecting data after 41.25 minutes.

One microliter of sample was injected into the GC either manually or by using an autosampler. The following shows the order of the major peaks and their approximate retention times:

| alpha-methylstyrene (ams) | 4.00 min. |
|---|---|
| diphenylamine (dpa) | 13.1 min. |
| AMS dimers | 14.5, 15.3, 15.9 min. |
| ortho-monostyryl DPA | 20.7 min. |
| para-monostyryl DPA (MAMS) | 23.7 min. |
| o,o-distyryl DPA | 27.7 min. |
| o,p-distyryl DPA | 28.9 min. |
| pp-distyryl DPA (DAMS) | 31.8 min. |

The results of the analyses are set forth in Table I as follows:

TABLE I

GC ANALYSES OF THE REACTION PRODUCTS OF EXAMPLES 1-13 AND COMPARATIVE EXAMPLES 2-9

| | Mole Percent MAMS DPA | Mole Percent DAMS DPA | Mole Percent DPA | Molar Ratio MAMS DPA/DAMS DPA | Solid Or Liquid |
|---|---|---|---|---|---|
| Example | | | | | |
| 1 | 53.0 | 36.5 | 0.5 | 1.45 | L |
| 2 | 55.2 | 38.6 | 1.2 | 1.43 | L |
| 3 | 64.6 | 33.3 | 0.1 | 1.94 | L |
| 4 | 63.3 | 36.0 | N/D | 1.76 | L |
| 5 | 83.2 | 15.4 | 0.5 | 5.39 | L |
| 6 | 85.3 | 13.5 | 0.4 | 6.33 | L |
| 7 | 79.7 | 19.2 | 0.4 | 4.15 | L |
| 8 | 72.7 | 26.2 | 0.4 | 2.77 | L |
| 9 | 66.5 | 32.5 | 0.2 | 2.04 | L |
| 10 | 62.2 | 36.5 | 0.4 | 1.70 | L |
| 11 | 61.6 | 36.7 | — | 1.68 | L |
| 12 | 59.8 | 38.9 | — | 1.54 | L |
| 13 | 64.5 | 34.8 | — | 1.85 | L |
| Comparative Example | | | | | |
| 1 | 95.0 | 5.0 | 0 | 19 | S |
| 2 | 48.6 | 44.1 | 1.0 | 1.10 | S |
| 3 | 51.0 | 42.3 | 1.1 | 1.23 | S |
| 4 | 51.8 | 41.6 | 1.1 | 1.33 | S |
| 5 | 52.8 | 38.9 | 1.2 | 1.36 | S |
| 6 | 84.8 | 3.4 | 9.6 | 25.0 | S |
| 7 | 94.2 | 4.1 | 0.4 | 23.0 | S |
| 8 | 38.6 | 60.2 | 0.6 | 0.64 | S |
| 9 | 0.5 | 99.2 | — | 0.005 | S |

EXAMPLE 14

PREPARATION AND CURING OF POLYURETHANE FOAMS

The methyl styrenated diphenylamine mixtures of Examples 6 and 11–13 and Comparative Examples 1 and 9, supra, were added to polyether polyol, the stabilized polyols subsequently being used for the manufacture of polyurethane foams.

A premix containing water, Niax A-1 catalyst (Union Carbide Co.) and L-620 silicone surfactant (Union Carbide Co.) was added to 200 g of a 3000 g/mol average molecular weight polyether polyol which had been minimally stabilized against degradation (100 ppm BHT).

FR Thermolin 101 as five retardant (Olin Corp.) and t-9 tin catalyst (Air Products Corp.) were then added to the composition which was mixed in a high speed lightning mixer for 15 seconds. The final ingredient, toluene diisocyanate (a 20:80 weight percent mixture of the 2,4-isomer and 2,6 isomer from Mobay Corp.), was thereafter added. The mixture was stirred at high speed for 7 additional seconds and then poured into a 10″×10″×5″ cardboard container.

The foam was allowed to rise completely at room temperature (indicated by the appearance of bubbles across the surface of the foam bun) and then allowed to stand for 5 additional minutes. The sides of the container were removed before curing the sample for 17.5 minutes at 20% power in a GE Whirlpool microwave oven. The foams were thereafter air oven cured for 3 minutes at 125° C. immediately after microwave cure.

Upon removal of the foam from the air circulating oven, the foams were immediately cut in half, horizontally to the rise of the foam, and analyzed for degree of scorch using the Hunterlab Colorimeter, Model D25M/L. The performance ratings, presented in Table II below, are based on a scale of 1-10 with 1 representing the best scorch protection and 10 being the worst.

The purpose of the microwave scorch test is to produce a small amount of scorch in each foam sample so that the stabilizer compositions of this invention can be compared to the controls (Comparative Examples 1 and 9) for their relative effectiveness in preventing scorch. The values for scorch protection provided by the liquid stabilizers of this invention were all found to be comparable to the standard, Comparative Example 9, which is commercially available as Naugard 445.

TABLE II

MICROWAVE SCORCH TEST DATA

| Example | Microwave Scorch Test Result |
|---|---|
| 6 | 2− |
| 11 | 2 |
| 12 | 3 |
| 13 | 2+ |
| Comparative | |

TABLE II-continued

MICROWAVE SCORCH TEST DATA

| Example | Microwave Scorch Test Result |
|---|---|
| 1 | 2 |
| 9 | 2 |

The above data demonstrate that the liquid stabilizers of this invention perform comparably to or better than those of Comparative Examples 1 and 9. The liquid stabilizer composition herein possesses the additional advantage of providing ease of use and metering and improved quality control relative to the solid stabilizers of the Comparative Examples.

What is claimed is:

1. A polyurethane foam obtained from a polyurethane foam-forming reaction mixture containing a liquid stabilizing composition comprising a mixture of 4-alpha,alpha-dimethylbenzyl diphenylamine and 4,41-bis-(alpha,alpha-dimethylbenzyl)diphenylamine.

2. The polyurethane foam of claim 1 wherein the mole ratio of 4-alpha,alpha-dimethylbenzyl diphenylamine to 4,4'-bis-(alpha,alpha-dimethylbenzyl) diphenylamine is from about 1.4 to about 20.

3. The polyurethane foam of claim 1 wherein the mole ratio of 4-alpha,alpha-dimethylbenzyl diphenylamine to 4,4'-bis-(alpha,alpha-dimethylbenzyl) diphenylamine is from about 1.5 to about 10.

4. The polyurethane foam of claim 1 wherein the polyurethane foam-forming reaction mixture contains a polyether polyol, said polyol containing the liquid stabilizer composition prior to admixture with the remaining components of the polyurethane foam-forming reaction mixture.

* * * * *